United States Patent
Mori et al.

(10) Patent No.: US 8,861,621 B2
(45) Date of Patent: Oct. 14, 2014

(54) RECEIVER CIRCUIT

(71) Applicant: Denso Corporation, Kariya (JP)

(72) Inventors: Hiroyuki Mori, Obu (JP); Naoki Kamikawa, Nishio (JP); Masayoshi Satake, Okazaki (JP); Tomohisa Kishigami, Obu (JP); Tomoyuki Koike, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/973,203

(22) Filed: Aug. 22, 2013

(65) Prior Publication Data

US 2014/0056388 A1    Feb. 27, 2014

(30) Foreign Application Priority Data

Aug. 24, 2012   (JP) ................. 2012-185176

(51) Int. Cl.
    *H04B 3/00*        (2006.01)
    *H04B 1/10*        (2006.01)

(52) U.S. Cl.
    CPC ........................... *H04B 1/10* (2013.01)
    USPC .............. 375/257; 375/219; 375/340; 326/31

(58) Field of Classification Search
    CPC ............ H04L 27/2647; H04L 25/0272; H04L 25/0292; H04L 25/0278; H04L 25/0298; H04L 12/40; H04L 27/38; G06F 13/4072; G06F 13/4086
    USPC ......... 375/219, 220, 257, 259, 316, 324, 340, 375/377; 326/30, 31, 33; 327/18, 20, 50, 58
See application file for complete search history.

(56) References Cited

U.S. PATENT DOCUMENTS

| 6,326,803 | B1 | 12/2001 | Takeda | |
|---|---|---|---|---|
| 8,396,164 | B2 * | 3/2013 | Suzuki et al. | 375/316 |
| 2011/0293036 | A1 * | 12/2011 | Ishimaru et al. | 375/295 |
| 2013/0076436 | A1 * | 3/2013 | Chiaburu et al. | 330/105 |

FOREIGN PATENT DOCUMENTS

| JP | 2001-127805 | 5/2001 |
|---|---|---|
| JP | 2004-080721 | 3/2004 |

OTHER PUBLICATIONS

Office Action dated Jun. 24, 2014 in corresponding Japanese Application No. 2012-185176.

* cited by examiner

*Primary Examiner* — Dac Ha
(74) *Attorney, Agent, or Firm* — Harness, Dickey & Pierce, PLC

(57) ABSTRACT

In a receiver circuit, a binary signal is generated based on a signal level of a received signal that has been received via a transmission line from a driver of a transmitter circuit. Then, a first stable state and a second stable state are detected based on a reference signal whose signal level changes in accordance with the received signal. In the first stable state, the received signal is stable at a first signal level. In the second stable state, the received signal is stable at a second signal level. When the first stable state is detected and the received signal is changed from the first signal level into the second signal level, the generated binary signal is retained at a signal level corresponding to the second signal level, until the second stable state is detected.

15 Claims, 6 Drawing Sheets

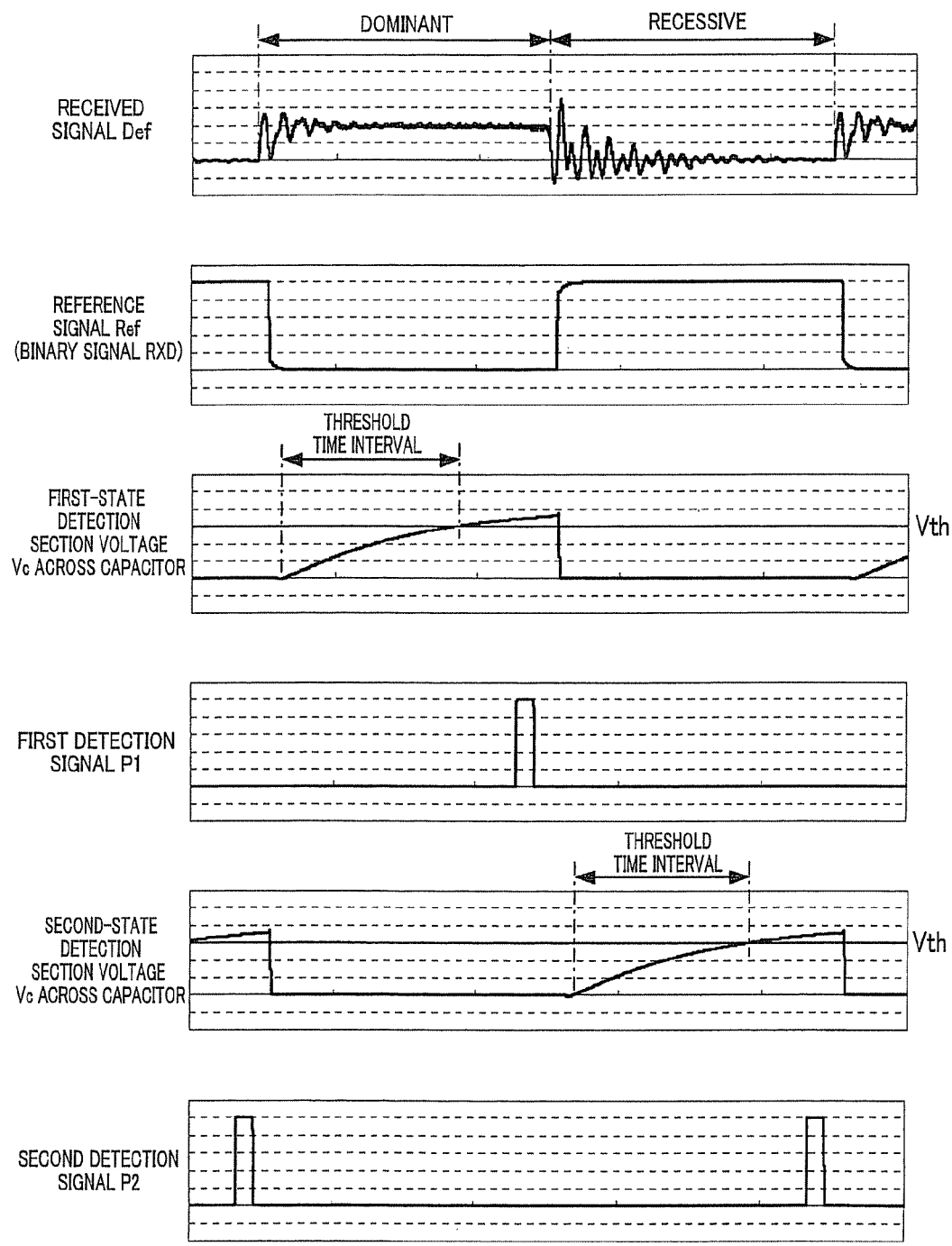

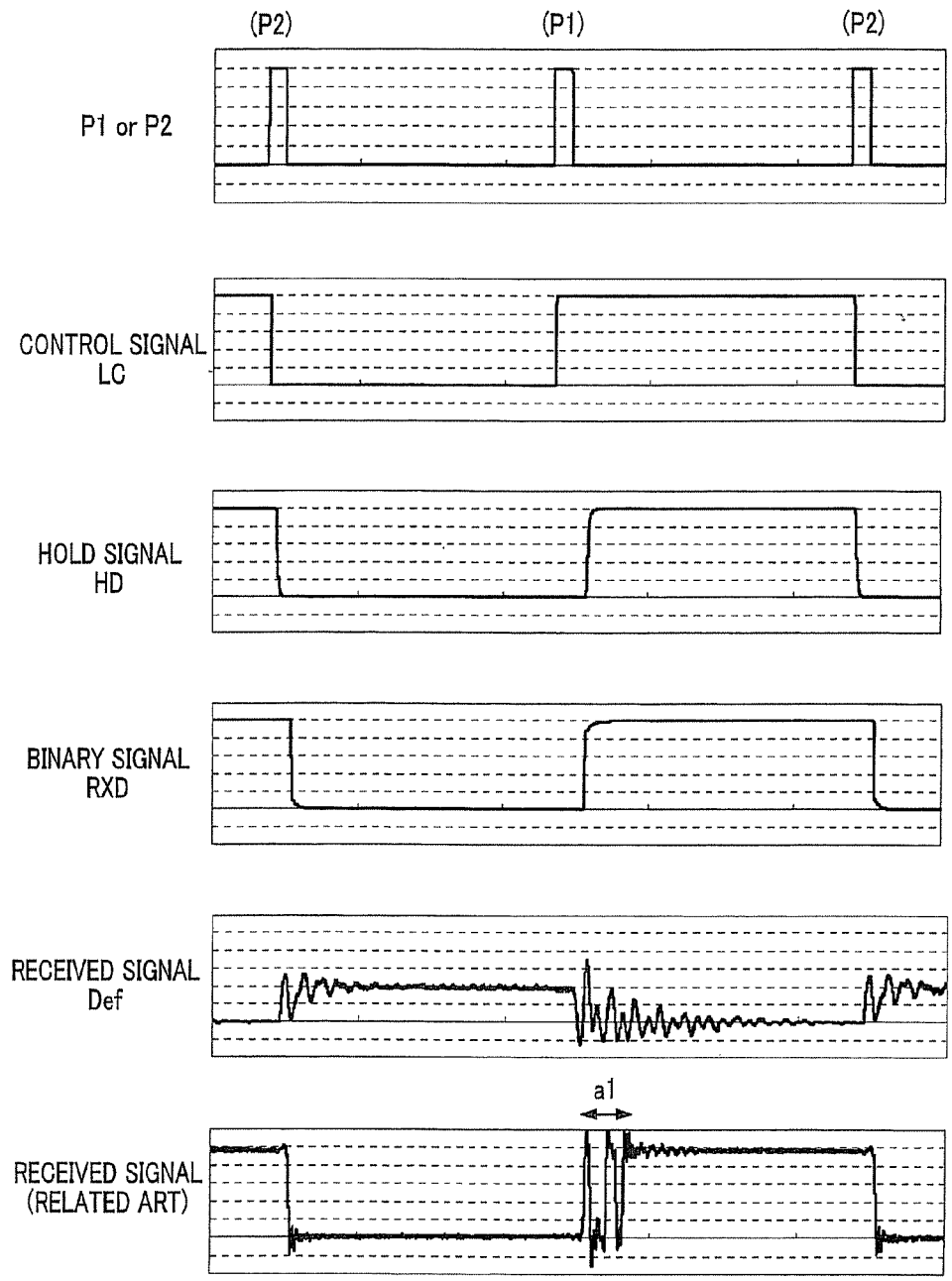

RECEIVER CIRCUIT

CROSS-REFERENCE TO RELATED APPLICATION

This application is based on and claims the benefit of priority from earlier Japanese Patent Application No. 2012-185176 filed Aug. 24, 2012, the description of which is incorporated herein by reference.

BACKGROUND

1. Technical Field

The present invention relates to a receiver circuit that receives signals via a transmission line with a bus configuration.

2. Related Art

In related art, a communication system is known that transmits signals using a transmission line with a bus configuration. In this communication system, an impedance mismatch may occur at ends of the transmission line or at connecting ends of nodes on the transmission line. If such an impedance mismatch occurs, signals are reflected between these ends of the transmission line. The reflection resultantly induces ringing by which signals are permitted to repeatedly propagate on the transmission line. This causes oscillation in the signal waveform. Further, the ringing may cause distortion in the waveform of the transmission signals.

This waveform distortion chiefly occurs at an edge at which the signal level changes, and then converges with time. However, when the waveform distortion does not sufficiently converge before the timing of judging the signal level of bits, the signal level may be erroneously judged.

In particular, the communication system mentioned above is often configured to use a driver (e.g., a transistor having an open collector configuration) for the transmission of signals. This driver has output impedance that greatly changes between the time when a high-level signal is outputted and the time when a low-level signal is outputted. The communication system configured in this way may seriously suffer from waveform distortion at an edge where the output impedance changes from low to high.

A well-known approach for reducing such erroneous judgement of a signal level provides a configuration in which a resistance is connected in parallel with a terminating resistor for a predetermined time interval at the edge timing when the signal level of the transmission line changes. With this approach, the impedance of the transmission line is lowered to thereby prevent the occurrence of ringing and further the occurrence of waveform distortion (e.g., see JP-A-2001-127805).

However, the impedance of a transmission line varies depending on the length of the transmission line or the number of nodes connected to the transmission line. For this reason, the amount of resistance applied to a transmission line for the effective prevention of ringing varies depending on systems. Moreover, in a system in which nodes can be added on, the conditions of the system may alter after the nodes are added on. Therefore, the approach based on the related art raises a problem that a sufficient effect of preventing ringing is not necessarily ensured.

Thus, in order to sufficiently prevent the influence of waveform distortion, it has been necessary after all to limit the routing scale (the number of nodes, the length of wiring, the number of branches, etc.) or the communication speed.

SUMMARY

The present disclosure provides a receiver circuit which is able to prevent erroneous judgement attributed to waveform distortion.

According to one aspect of the present disclosure, there is provided a receiver circuit for receiving a signal that is transmitted via a transmission line from a driver configuring a transmitter circuit. The driver has an output terminal from which a signal is transmitted to the transmission line. The signal has a first signal level when an output impedance of the output terminal is low and has a second signal level when an output impedance of the output terminal is high.

The receiver circuit includes a signal generation section, a state detection section, and a signal retention section. The signal generation section generates a binary signal based on a signal level of a received signal that has been received via the transmission line. A state detection section detects a first stable state and a second stable state based on a reference signal whose signal level changes in accordance with the received signal. The first stable state is a state where the received signal is stable at the first signal level, and the second stable state is a state where the received signal is stable at the second signal level.

Furthermore, when the first stable state is detected by the state detection section and when the received signal is changed from the first signal level into the second signal level, the signal retention section retains the binary signal generated by the binary signal generation section at a signal level corresponding to the second signal level, until the second stable state is detected by the state detection section.

Specifically, after the first stable state of the received signal is detected, the signal level of the received signal changes from the first signal level to the second signal level. Then, the signal level of the binary signal immediately turns to a signal level corresponding to the second signal level. Subsequently, this signal level is retained until the second stable state is detected, irrespective of the signal level of the received signal.

After that, when the second stable state of the received signal is detected, the state of retaining the signal level is released. Then, a binary signal is generated according to the signal level of the received signal, until the first stable state of the received signal is detected.

In this way, instead of preventing the occurrence of waveform distortion, the receiver circuit of the present disclosure detects an edge (the edge at which the first signal level turns to the second signal level) which is likely to cause large waveform distortion. Upon detection of the edge, the receiver circuit retains the level of the binary signal at a constant level. Thus, the waveform distortion that appears in the received signal is ensured to be prevented from influencing the signal level of the binary signal.

Thus, the receiver circuit of the present disclosure is able to prevent erroneous judgement of a signal level, which is attributed to the waveform distortion of the received signal, without taking any special measure for preventing the occurrence of waveform distortion. As a result, the receiver circuit can be favorably used in a communication system having a larger routing scale or in a communication system having higher communication speed.

BRIEF DESCRIPTION OF DRAWINGS

In the accompanying drawings:

FIG. 4 is a timing diagram illustrating operations of a first-state detection section and a second-state detection section of the binary circuit in FIG. 3;

FIG. 5 is a timing diagram illustrating operations of a hold control section and a level determination section of the binary circuit in FIG. 3.

DESCRIPTION OF EMBODIMENTS

With reference to the accompanying drawings, hereinafter is described an exemplary embodiment of the present invention.

(General Structure)

In an example set forth below, the present invention is applied to an in-vehicle communication system 1 that uses CAN (Controller Area Network) as a communication protocol.

Figure 1:
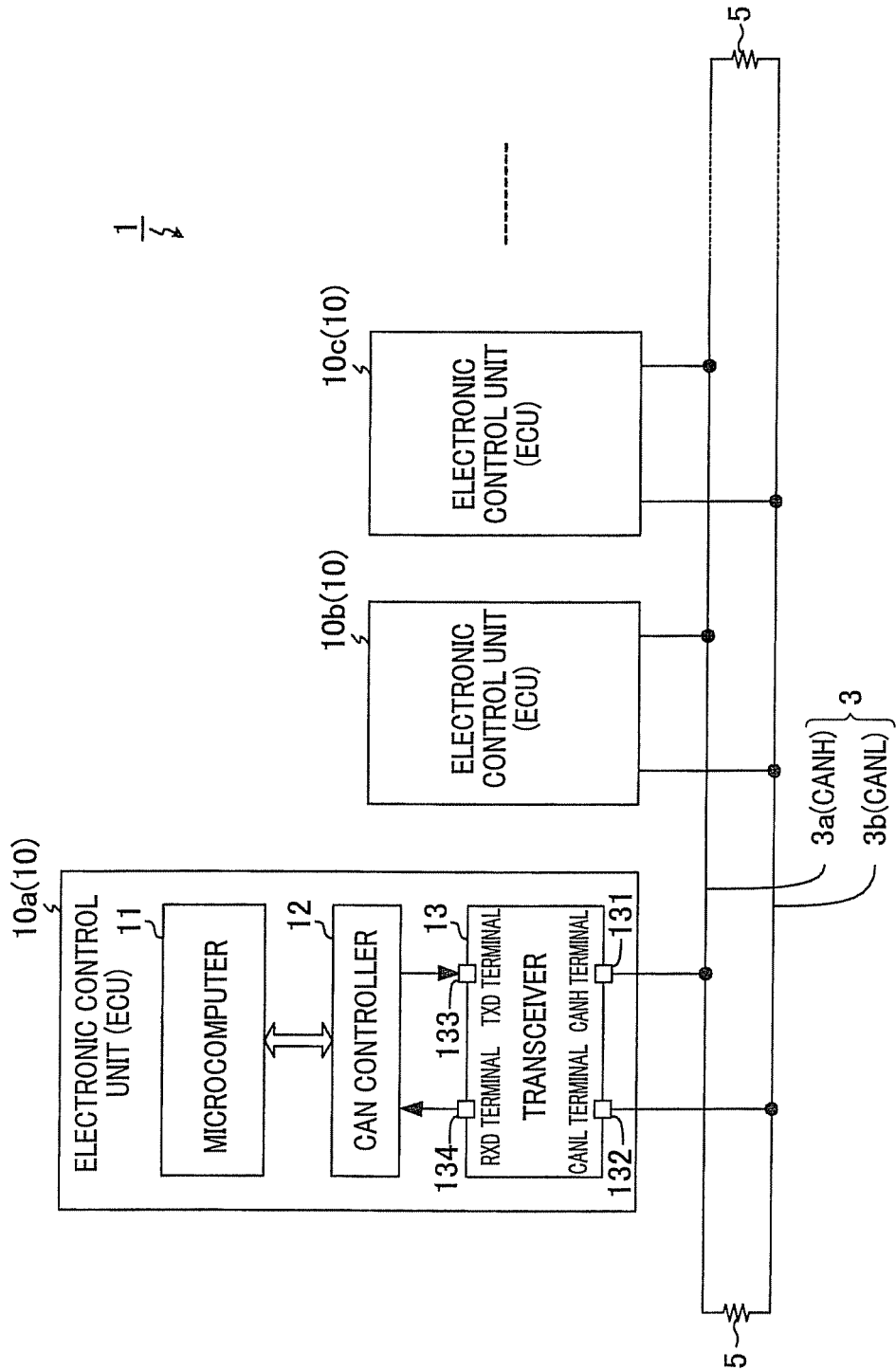
FIG. 1 is a block diagram illustrating a general configuration of an in-vehicle communication system to which the present exemplary embodiment is applied.

FIG. 1 is a block diagram illustrating a general configuration of the in-vehicle communication system 1. As shown in FIG. 1, the communication system 1 is configured by connecting a plurality of electronic control units 10 (10a, 10b, 10c, . . . ), which are installed in a vehicle, so as to enable intercommunication via a common transmission line 3. Each of the electronic control units 10 functions as a node. In the following description, an electronic control unit is referred to as ECU. Further, when any one of the ECUs 10 is referred to without being particularly distinguished in the following description, the ECU in question is referred to as an ECU 10.

Of these components, the transmission line 3 is composed of a bus-type two-wire transmission line that includes a pair of signal lines 3a and 3b (hereinafter referred to as "CANH3a" and "CANL3b", respectively). Both ends of the transmission line 3 are terminated by respective terminating resistors 5 and 5. The transmission line 3 transmits a differential signal that indicates a signal level based on a potential difference between CANH3a and CANL3b.

In the following description, the term "dominant" refers to a state where the potential difference between CANH3a and CANL3b is equal to or larger than a predetermined code judgement threshold, and the term "recessive" refers to a state where the potential difference is smaller than the predetermined code judgement threshold.

(ECU)

The ECU 10 includes a microcomputer 11, a CAN controller 12, and a transceiver 13. The microcomputer 11 carries out a process of controlling various components of the vehicle, a process of performing communication with a different ECU 10 using the CAN controller 12, and the like. The CAN controller 12 carries out communication control (generation of a transmission frame and analysis of a reception frame) according to the CAN protocol via the communication system 1.

The transceiver 13 converts a binary signal (transmission data string) into a differential signal and outputs the converted signal to the transmission line 3. The binary signal in this case is given by the CAN controller 12 and is composed of a binary code. At the same time, the transceiver 13 receives a differential signal on the transmission line 3 and decodes the differential signal into a binary code as a binary signal (reception data string). The transceiver 13 then outputs the binary signal to the CAN controller 12.

Hereinafter, in the transceiver 13, a terminal to which CANH3a is connected is referred to as a "CANH terminal 131", a terminal to which CANL3b is connected is referred to as a "CANL terminal 132", a terminal into which the data string supplied from the CAN controller 12 is inputted is referred to as a "TXD terminal 133", and a terminal from which the data string supplied to the CAN controller 12 is outputted is referred to as a "RXD terminal 134".

(Transceiver)

Figure 2:
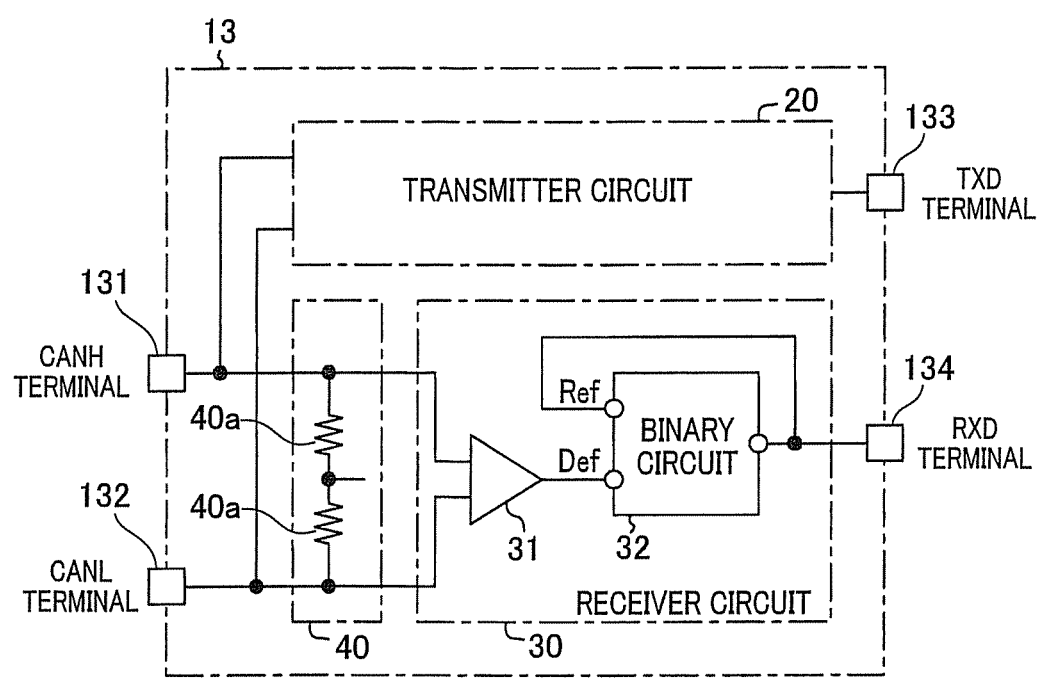
FIG. 2 is a block diagram illustrating a configuration of a transceiver of the communication system in FIG. 1.

FIG. 2 is a block diagram illustrating a configuration of the transceiver 13. As shown in FIG. 2, the transceiver 13 includes a transmitter circuit 20, a receiver circuit 30 and a neutral voltage generation circuit 40. The transmitter circuit 20 converts a transmission data string (binary signal) received via the TXD terminal 133 into a differential signal and outputs the differential signal to the CANH terminal 131 and the CANL terminal 132. The receiver circuit 30 decodes the differential signal received via the CANH terminal 131 and the CANL terminal 132 into a reception data string (binary signal) and outputs the reception data string to the RXD terminal. The neutral voltage generation circuit 40 includes a pair of resistors 40a, 40b, and generates a neutral voltage that is a voltage exhibited by CANH3a and CANL3b when the differential signal is recessive.

Of these components, the transmitter circuit 20 and the neutral voltage generation circuit 40 are well known and thus the description is omitted here. In the embodiment, the transmitter circuit 20 is configured by a driver circuit in which the output impedance becomes high when a recessive signal is outputted but becomes low when a dominant signal is outputted. The following description is focused on the receiver circuit 30 that is a principal part of the present invention.

The receiver circuit 30 includes a receiver 31 and a binary circuit 32. The receiver 31 is made up of a differential amplifier that generates a unipolar received signal Def with an amplitude meeting the potential difference of the differential signal. The binary circuit 32 receives the received signal Def supplied from the receiver 31, and generates a binary signal RXD, based on the received signal Def and a reference signal Ref. In the present embodiment, as the reference signal Ref, a feedback of the binary signal RXD is used in the binary circuit 32.

In the present embodiment, as shown in a timing diagram of FIG. 4, in the received signal Def, recessive state corresponds to low level and dominant state corresponds to high level. On the other hand, in the binary signal RXD, recessive state corresponds to high level and dominant state corresponds to low level.

(Binary Circuit)

Figure 3:
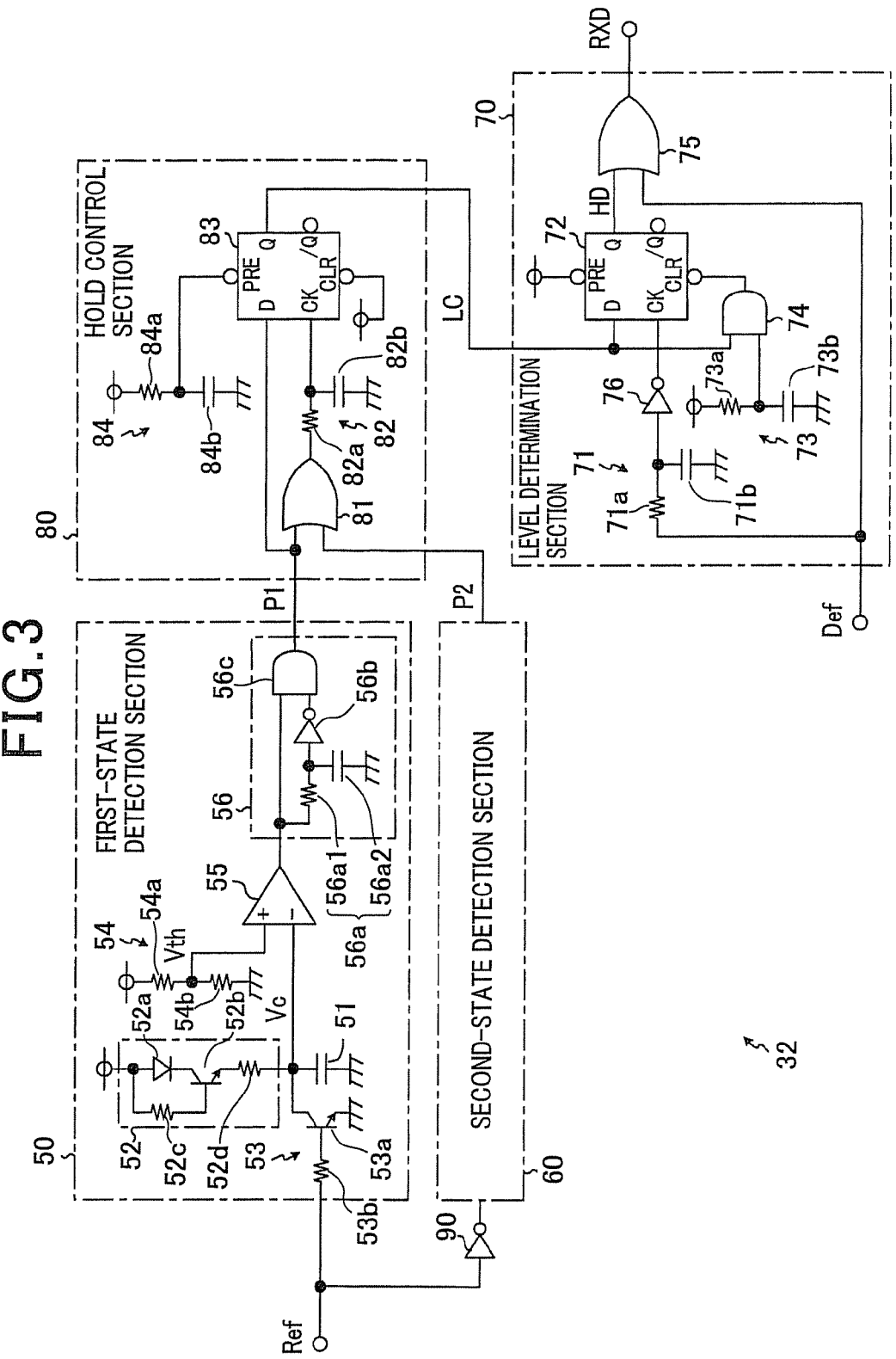
FIG. 3 is a circuit diagram illustrating a specific configuration of a binary circuit of the transceiver in FIG. 2.

FIG. 3 is a circuit diagram illustrating a specific configuration of the binary circuit 32. As shown in FIG. 3, the binary circuit 32 includes a first-state detection section 50, a second-state detection section 60, a level determination section 70, and a hold control section 80.

The first-state detection section 50 uses as a basis the reference signal Ref (binary signal RXD here) to detect that the reference signal Ref is in a first stable state that is a state where the reference signal Ref is stable at a low level (signal level that corresponds to dominant state).

The second-state detection section 60 uses as a basis an inverted signal, which is an inversion of the reference signal Ref obtained by an inverter circuit 90, to detect that the reference signal Ref is in a second stable state that is a state where the reference signal Ref is stable at a high level (signal level that corresponds to recessive state).

The level determination section 70 uses as a basis the received signal Def and a level control signal LC to determine the level of the binary signal RXD.

The hold control section 80 uses as a basis the results of the detection derived from the first- and second-state detection sections 50 and 60 to generate the level control signal LC for controlling the operation of the level determination section 70.

(First-state Detection Section)

The first-state detection section 50 includes a capacitor (capacitive element) 51, charge circuit 52, and a discharge circuit 53. The capacitor 51 has a grounded end. The charge circuit 52 includes a diode 52a, a transistor 52b, and two resistors 52c, 52d, and charges the capacitor 51 at a predetermined rate. The discharge circuit 53 is includes a transistor 53a and a resistor 53b, and discharges electric charges of the capacitor 51 when the reference signal Ref is at a high level.

The first-state detection section 50 also includes a voltage divider circuit 54, a comparator 55, and an edge detection circuit 56. The voltage divider circuit 54 includes a pair of resistors 54a, 54b to divide power supply voltage for the generation of a threshold voltage Vth. The comparator 55 provides output of a high level when a voltage Vc across the capacitor 51 exceeds the threshold voltage Vth of the voltage divider circuit 54. The edge detection circuit 56 timely generates a pulsed first detection signal P1 that indicates detection of the first stable state, when the output of the comparator 55 has changed from a low level to a high level.

The edge detection circuit 56 includes a delay circuit 56a, an inverter circuit 56b, and an AND circuit 56c, which configure a well-known circuit that detects a rising edge of a signal. The delay circuit 56a includes a resistor 56a1 and a capacitor 56a2, and delays the output of the capacitor 55. The inverter circuit 56b inverts the output of the delay circuit. The AND circuit 56c performs an AND operation between two inputs: one is the output of the comparator 55; and the other is the output of the inverter circuit 56b.

The threshold voltage Vth generated by the voltage divider circuit 54 is set to a level that will be reached by the voltage Vc across the capacitor 51 when the capacitor 51 is uninterruptedly charged throughout a threshold time interval. The threshold time interval is set so as to be longer than the cycle of the main components of ringing that occurs on the transmission line but shorter than the width of one bit of a transmission line code (e.g., set to a length corresponding to 80% of one bit).

The first-state detection section 50 determines the level of the received signal Def as being in a stable state when the level of the reference signal Ref is uninterruptedly retained at a low level (dominant state), as shown in FIG. 4, throughout the threshold time interval or more. In this case, the first-state detection section 50 outputs the pulsed first detection signal P1.

(Second-state Detection Section)

The second-state detection section 60 has completely the same configuration as that of the first-state detection section 50 and thus the description of the configuration is omitted. However, instead of the reference signal Ref, the second-state detection section 60 receives a signal that is an inversion of the reference signal Ref obtained by the inverter circuit 90.

Specifically, the second-state detection section 60 determines the level of the received signal Def as being stable when the level of the reference signal Ref is retained at a high level (recessive state), as shown in FIG. 4, throughout the threshold time interval or more. In this case, the second-state detection section 60 outputs a pulsed second detection signal P2.

(Hold Control Section)

Referring to FIG. 3 again, the hold control section 80 is specifically described. The hold control section 80 includes an OR circuit 81, a delay circuit 82, a flip-flop circuit 83, and a preset signal generation circuit 84.

The OR circuit 81 performs an OR operation between two inputs: one is the output of the first-state detection section 50, i.e., the first detection signal P1; and the other is the output of the second-state detection section 60, i.e., the second detection signal P2.

The delay circuit 82 includes a resistor 82a and a capacitor 82b, and delays the output of the OR circuit 81, in order to match the timing in such a manner that the flip-flop circuit 83 can reliably sample the signal level of the first detection signal P1 which is at a high level when the first detection signal P1 is received.

The flip-flop circuit 83 has a clock input (CK) and a data input (D). The clock input is connected to the output of the delay circuit 82, and the data input is connected to the output of the first detection signal P1. This flip-flop circuit 83 operates depending on the clock input (i.e., the output of the delay circuit 82) and the data input (i.e., the output of the first detection signal P1).

The preset signal generation circuit 84 includes a resistor 84a and a capacitor 84b, and generates a preset signal for the flip-flop circuit 83, which is retained at a low level for a predetermined time interval when power is turned on, thereby initializing the level control signal LC, which corresponds to the output of the flip-flop circuit 83, to a high level.

Specifically, the level control signal LC is initialized to a high level at the start-up. Thereafter, as shown in a timing diagram of FIG. 5, the level control signal LC turns to a high level when the first detection signal P1 is inputted and to a low level when the second detection signal P2 is inputted.

(Level Determination Section)

Referring to FIG. 3 again, the level determination section 70 is specifically described. The level determination section 70 includes a delay circuit 71, an inverter circuit 76, a flip-flop circuit 72, clear signal generation circuit 73, an AND circuit 74, and an OR circuit 75.

The delay circuit 71 includes a resistor 71a and a capacitor 71b, and delays the received signal Def. The inverter circuit 76 inverts the output of the delay circuit 71.

The flip-flop circuit 72 has a clock input (CK) and a data input (D). The clock input is connected to the output of the inverter circuit 76, and the data input is connected to the output of the flip-flop circuit 83, i.e., the level control signal LC. The flip-flop circuit 72 operates depending on the clock input (i.e., the output of the inverter circuit 76) and the data input (i.e., the level control signal LC).

The clear signal generation circuit 73 includes a resistor 73a and a capacitor 73b, and generates a clear signal for the flip-flop circuit 72, which is retained at a low level for a predetermined time interval when power is turned on, thereby initializing a hold signal HD, which corresponds to the output of the flip-flop circuit 72, to a low level.

The AND circuit 74 performs an AND operation between two inputs: one is the level control signal LC; and the other is the clear signal. The output of the AND circuit 74 is used as a clear input of the flip-flop circuit 72.

The OR circuit 75 performs an OR operation between two inputs: one is the hold signal HD which is the output of the flip-flop circuit 72; and the other is the received signal Def. The output of the OR circuit 75 is used as the binary signal RXD.

Specifically, the hold signal HD is initialized to a low level at the start-up. Thereafter, as shown in FIG. 5, when the level control signal LC is at a high level (i.e. a state where the first stable state has been detected), the hold signal HD timely turns to a high level when the level of the received signal Def turns from high to low. After that, when the level control signal LC turns to a low level (i.e. a state where the second stable state has been detected), the hold signal HD returns to a low level.

The binary signal RXD is generated in accordance with the level of the received signal Def during the period from the detection of the second stable state where the hold signal HD turns to a low level, up to the detection of the first stable state. After the detection of the first stable state where the hold signal HD turns to a high level, once the received signal Def turns to a high level, the binary signal RXD is thereafter retained to a high level until the detection of the second stable state, irrespective of the level of the received signal Def.

(Advantages)

As described above, instead of preventing the occurrence of waveform distortion, the receiver circuit 30 of the ECU 10 detects an edge (at which first stable state is detected and the level of the received signal Def turns from high to low) which is likely to cause large waveform distortion. Upon detection of the edge, the receiver circuit 30 retains the level of the binary signal RXD at a high level (recessive state). Thus, the waveform distortion that appears in the received signal Def is ensured to be prevented from influencing the level of the binary signal RXD.

Thus, the receiver circuit 30 is able to prevent erroneous judgement of a signal level, which is attributed to the waveform distortion of the received signal Def, without taking any special measure for preventing the occurrence of waveform distortion. As a result, the receiver circuit 30 can be favorably used in a communication system having a larger routing scale or in a communication system having higher communication speed.

For comparison, FIG. 5 shows, at the bottom, a waveform of a received signal in the case where the occurrence of waveform distortion is prevented by applying a method based on related art.

As can be seen from FIG. 5, according to the method based on related art, the waveform distortion of the received signal Def promptly converges. However, there is a delay before any effects can be seen after the change of the signal level. Therefore, removal of distortion (indicated by the arrow a1 in FIG. 5) is disabled in a time interval immediately after the change of the signal level. If this received signal is binarized, the influence of the waveform distortion would appear in the binary signal.

In this regard, as can also be seen from FIG. 5, the binary signal RXD outputted from the receiver circuit 30 is removed with the influence of waveform distortion.

(Modifications)

An embodiment of the present invention has been described so far. However, the present invention is not limited to the embodiment described above but may be implemented in various modes within a range not departing from the spirit of the present invention.

Figure 6A:
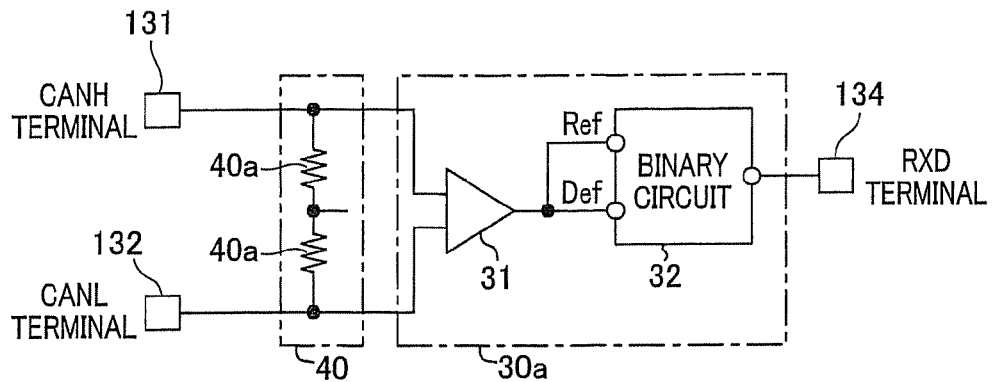
FIGS. 6A to 6C are block diagrams illustrating modifications of a receiver circuit of the transceiver in FIG. 2.
Figure 6B:
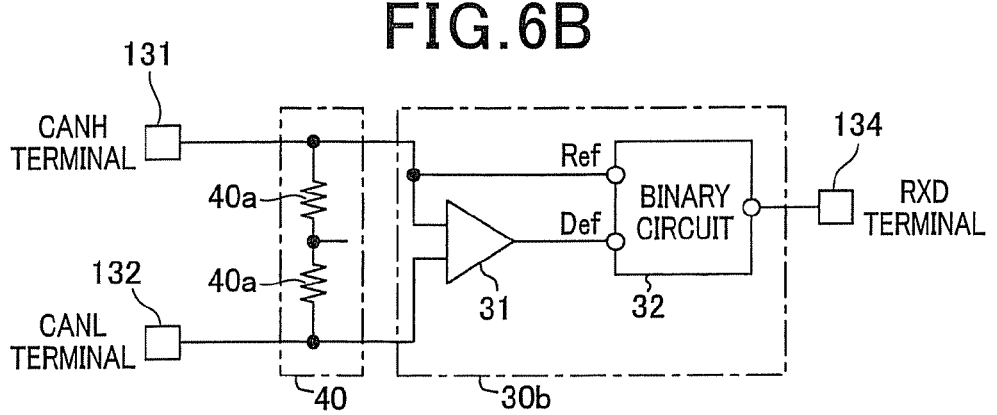
Figure 6C:
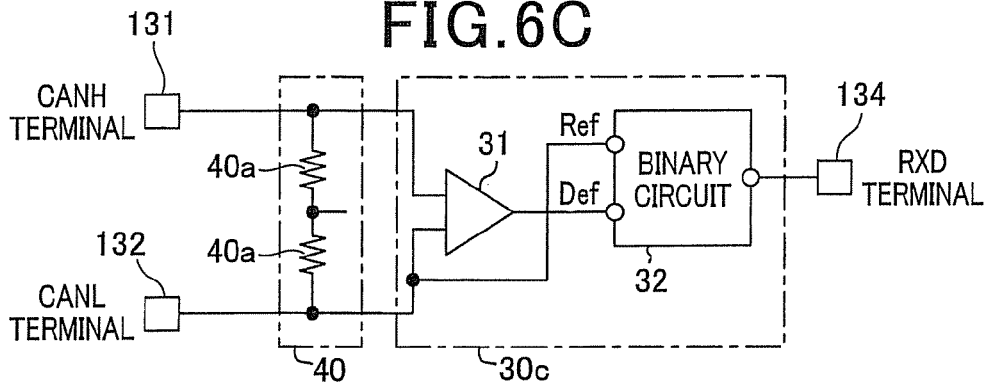

For example, in the above embodiment, the receiver circuit 30 is configured to use the binary signal RXD as the reference signal Ref. However, this shall not impose a limitation. For example, as in a receiver circuit 30a shown in FIG. 6A, the received signal Def may be used as the reference signal Ref. Alternatively, as in a receiver circuit 30b shown in FIG. 6B, a transmission signal received from the CANH terminal may be used as the reference signal Ref. Alternatively, as in a receiver circuit 30c shown in FIG. 6C, a transmission signal received from the CANL terminal may be used as the reference signal Ref.

However, in the receiver circuits 30a and 30b, when the levels of the reference signal Ref, which correspond to dominant and recessive states, are different from the levels of the binary signal RXD, the reference signal Ref may be inputted to the first-state detection section 50 after being inversed, while being inputted as it is to the second-state detection section 60.

In the embodiment described above, the first and second stable states are ensured to be detected by an analogue circuit that mainly includes the capacitor 51, the charge circuit 52 and the discharge circuit 53. However, no limitation shall be imposed by this. For example, the point of inversion of a signal level may be detected and then the threshold time interval may be clocked from the detected point using a timer, so that the detection signals P1 and P2 can be timely outputted upon time-out.

In the embodiment described above, the transmission line 3 is a two-wire transmission line. As an alternative to this, a single-wire transmission line may be used.

What is claimed is:

1. A receiver circuit comprising:
a signal generation section that generates a binary signal based on a signal level of a received signal that has been received via a transmission line from a driver configuring a transmitter circuit, the driver having an output terminal from which a signal is transmitted to the transmission line, the signal having a first signal level when an output impedance of the output terminal is low and having a second signal level when an output impedance of the output terminal is high;
a state detection section that detects a first stable state and a second stable state based on a reference signal whose signal level changes in accordance with the received signal, the first stable state being a state where the received signal is stable at the first signal level, the second stable state being a state where the received signal is stable at the second signal level; and
a signal retention section that, when the first stable state is detected by the state detection section and when the received signal is changed from the first signal level into the second signal level, retains the binary signal generated by the binary signal generation section at a signal level corresponding to the second signal level, until the second stable state is detected by the state detection section.

2. The receiver circuit according to claim 1, wherein:
the state detection section outputs a detection result signal indicating that the received signal is in a stable state at a detection target level being the first signal level or the second signal level, when a state where the reference signal is at a signal level corresponding to the detection target level has continued for a threshold time or more, the threshold time being set so as to be longer than a cycle of a main component of ringing that occurs on the transmission line but shorter than a width of one bit of a signal transmitted to the transmission line.

3. The receiver circuit according to claim 2, wherein:
the state detection section includes:
a first capacitive element;
a first charge and discharge circuit that charges the first capacitive element at a predetermined rate while the reference signal is at a signal level corresponding to the first signal level, and which discharges electric charges of the first capacitive element when the reference signal is at a signal level corresponding to the second signal level;

a first determination circuit which determines that a signal level of the received signal is at the first stable state, when a voltage across the first capacitive element exceeds a threshold voltage corresponding to the threshold time;

a second capacitive element;

a second charge and discharge circuit that charges the second capacitive element at a predetermined rate while the reference signal is at a signal level corresponding to the second signal level, and which discharges electric charges of the second capacitive element when the reference signal is at a signal level corresponding to the first signal level; and a second determination circuit which determines that a signal level of the received signal is at the second stable state, when a voltage across the second capacitive element exceeds a threshold voltage corresponding to the threshold time.

4. The receiver circuit according to claim 1, wherein:
the reference signal is a binary signal that is generated by the binary signal generation section.

5. The receiver circuit according to claim 1, wherein:
the reference signal is a signal that is received from the transmission line.

6. The receiver circuit according to claim 1, wherein:
the transmission line is configured by a pair of signal lines that transmits a differential signal; and
the reference signal is a signal that is transmitted to any one of the signal lines.

7. The receiver circuit according to claim 2, wherein:
the reference signal is a binary signal that is generated by the binary signal generation section.

8. The receiver circuit according to claim 2, wherein:
the reference signal is a signal that is received from the transmission line.

9. The receiver circuit according to claim 2, wherein:
the transmission line is configured by a pair of signal lines that transmits a differential signal; and
the reference signal is a signal that is transmitted to any one of the signal lines.

10. The receiver circuit according to claim 3, wherein:
the reference signal is a binary signal that is generated by the binary signal generation section.

11. The receiver circuit according to claim 3, wherein:
the reference signal is a signal that is received from the transmission line.

12. The receiver circuit according to claim 3, wherein:
the transmission line is configured by a pair of signal lines that transmits a differential signal; and
the reference signal is a signal that is transmitted to any one of the signal lines.

13. A communication system, comprising:
a transmission line; and
a plurality of transceivers that transmit a signal via the transmission line,
each of the transceivers including:
a transmitter circuit configured by a driver having an output terminal from which a signal is transmitted to the transmission line, the signal having a first signal level when an output impedance of the output terminal is low and having a second signal level when an output impedance of the output terminal is high: and
a receiver circuit that receives a signal transmitted via the transmission line,
the receiver circuit including:
a signal generation section that generates a binary signal based on a signal level of a received signal that has been received via the transmission line;
a state detection section that detects a first stable state and a second stable state based on a reference signal whose signal level changes in accordance with the received signal, the first stable state being a state where the received signal is stable at the first signal level, the second stable state being a state where the received signal is stable at the second signal level; and
a signal retention section that, when the first stable state is detected by the state detection section and when the received signal is changed from the first signal level into the second signal level, retains the binary signal generated by the binary signal generation section at a signal level corresponding to the second signal level, until the second stable state is detected by the state detection section.

14. The communication system according to claim 13, wherein:
the communication system is an in-vehicle communication system having a plurality of electronic control units; and
each of the transceivers are provided in each of the electronic control units.

15. A receiving method for a communication system,
the communication system comprising: a transmission line; and a plurality of transceivers that transmit a signal via the transmission line, each of the transceivers including: a transmitter circuit configured by a driver having an output terminal from which a signal is transmitted to the transmission line, the signal having a first signal level when an output impedance of the output terminal is low and having a second signal level when an output impedance of the output terminal is high: and a receiver circuit that receives a signal transmitted via the transmission line,
the receiving method comprising:
at the receiver circuit,
generating a binary signal based on a signal level of a received signal that has been received via the transmission line;
detecting a first stable state and a second stable state based on a reference signal whose signal level changes in accordance with the received signal, the first stable state being a state where the received signal is stable at the first signal level, the second stable state being a state where the received signal is stable at the second signal level; and
when the first stable state is detected and when the received signal is changed from the first signal level into the second signal level, retaining the generated binary signal at a signal level corresponding to the second signal level, until the second stable state is detected.

* * * * *